(12) United States Patent
Smiley

(10) Patent No.: US 8,411,601 B2
(45) Date of Patent: Apr. 2, 2013

(54) ELECTROMAGNETIC WAVE CIRCUIT DISRUPTOR AND METHOD

(75) Inventor: Russell Clifford Smiley, Richmond (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 261 days.

(21) Appl. No.: 13/014,467

(22) Filed: Jan. 26, 2011

(65) Prior Publication Data
US 2012/0188918 A1 Jul. 26, 2012

(51) Int. Cl.
H04B 3/56 (2006.01)
H04B 7/005 (2006.01)
H01P 3/10 (2006.01)

(52) U.S. Cl. ......... 370/278; 455/263; 333/1.1; 333/186; 333/240

(58) Field of Classification Search ............... 455/11.1, 455/19, 24, 25, 73, 78, 80, 121, 277.1; 370/219–493; 340/514, 531, 539.1; 333/1.1–240; 331/1.1–4
See application file for complete search history.

(56) References Cited

U.S. PATENT DOCUMENTS

| | | | |
|---|---|---|---|
| 3,582,831 A | 6/1971 | Siekanowicz et al. | |
| 4,325,140 A * | 4/1982 | Stitzer | 455/19 |
| 4,361,905 A * | 11/1982 | Etherington et al. | 455/80 |
| 5,347,241 A | 9/1994 | Panaretos et al. | |
| 6,104,287 A | 8/2000 | Meyer | |
| 2006/0035600 A1* | 2/2006 | Lee et al. | 455/78 |
| 2007/0171892 A1* | 7/2007 | Chang et al. | 370/352 |
| 2008/0136563 A1* | 6/2008 | Duwel et al. | 333/186 |

OTHER PUBLICATIONS

Douglas,K,Microwave circulator design,Linkhart, Artech house, 1989,pp. 52-57.
PCT Search Report Corresponding to PCT/IB2012/050356.

* cited by examiner

*Primary Examiner* — Afsar Qureshi
(74) *Attorney, Agent, or Firm* — Luis Estable; Ericsson Canada Inc.

(57) ABSTRACT

Disclosed herein is an electromagnetic wave circuit disruptor apparatus including: a biasable non-reciprocal device having terminals for receiving and transmitting the electromagnetic signals, a controllable biaser, a signal detector, and a controller connected to the signal detector and the controllable biaser to selectively reverse the bias of the controllable biaser. The energy level at the receiver terminal of the non-reciprocal device is monitored to detect a condition such as an inappropriate amount of power at a circuit, such as at a receiver circuit. When a failure mode is detected the bias of the controllable biaser is reversed, thus reversing the direction of the non-reciprocal device. Instead of flowing into the circuit, energy flows into a properly matched load on a provided terminal of the non-reciprocal device and is dissipated.

20 Claims, 8 Drawing Sheets

ELECTROMAGNETIC WAVE CIRCUIT DISRUPTOR AND METHOD

CROSS-REFERENCE TO RELATED APPLICATIONS

This is the first application filed for the present application.

TECHNICAL FIELD

This application relates to apparatus for detecting electromagnetic waves reflected from a load in general, and to an electromagnetic wave circuit disruptor and method, in particular.

BACKGROUND OF THE APPLICATION

An electromagnetic wave propagation system usually has a transmitter and a receiver. The transmitter of one electromagnetic wave propagation system is used to transmit energy or information (in the form of energy) via an electromagnetic wave through a propagation medium to the receiver of another electromagnetic wave propagation system. Similarly, the receiver of one electromagnetic wave propagation system is used to receive energy or information from the transmitter of another electromagnetic wave propagation system. The transmitter is usually designed to transmit energy at a high level to overcome, as much as possible, the natural degradation of the electromagnetic wave as it travels through its propagation medium. When transmitted energy arrives at a receiver it is likely to be at a very low level so that the receiver is designed to be highly sensitive to very low energy levels.

It is frequently desirable, as known to those skilled in the art, to have the transmitter and receiver share an interface to the propagation medium. Such combined transmitter and receivers are known as transmitter-receiver systems or transceiver systems. Further discussion in this disclosure will assume a radio transceiver system with an antenna and by implication, a propagation medium in air or free space. Nonetheless, the techniques taught herein are not limited to antennas as the only load or limited to air or free space as a propagation medium. The most common propagation medium for RF would be free space, but alternatives could include, but are not limited to, materials such as air, PTFE or ceramic such as used in coaxial cable or waveguide.

Conventional technology uses a frequency duplexer, a special combination of filters to control the flow of energy from the transmitter to the antenna (propagation medium) and from the antenna (propagation medium) to the receiver such that the high energy levels of the transmitter in close proximity to the receiver do not overload the sensitive receiver circuits.

In some cases instead of using a duplexer for sharing the propagation medium between transmitter and receiver and a circulator is used. A circulator used in radio systems is a magnetic device with multiple terminals by which multiple signals enter or leave the terminals. The magnetic material in a circulator is usually ferrimagnetic and requires a magnetic bias to attain optimal operation. The magnetic bias is often provided by a rare earth magnet.

Thus in the radio system using a circulator when everything is connected properly the transmit signal flow from the transmitter up to the antenna and into the propagation medium, and signal entering the antenna from the propagation medium flows down into the receiver. Substantially no signal (or very little signal) flows from the transmitter directly to the receiver.

An important failure mode of the circuit is if the antenna or antenna cable becomes accidentally disconnected from the circulator. In this case the circulator terminal to which the antenna is connected becomes improperly matched. As a result transmitter energy flows directly into the receiver circuits. Since the transmitter energy is usually relatively high and the receiver circuits are very sensitive then there is significant risk that the receiver circuit will be overloaded or damaged.

U.S. Pat. No. 6,104,287 entitled "CIRCULATOR REVERSE POWER ALARM" by Charles John Meyer (hereinafter "Meyer") discloses an apparatus for detecting a damaged, disconnected, or disabled RF load in a communication system consisting of an alarm circuit and a device which passes RF signals reflected from the RF load to the alarm circuit.

Although Meyer discloses one solution to the problem of detecting a damaged, disconnected or disabled RF load in a communication system, the disclosed solution may not be able to mitigate damage to a communication system having a transceiver system and more generally to electromagnetic wave propagation systems having at least one transmitter and at least one receiver.

SUMMARY

According to one aspect of the present disclosure, there is provided: an electromagnetic wave circuit disruptor apparatus suitable for disrupting the action of electromagnetic signals, the apparatus comprises: (a) a biasable non-reciprocating device having terminals for receiving and transmitting the electromagnetic signals wherein the electromagnetic signals propagate around the non-reciprocating device terminals in a first direction when the non-reciprocating device is biased to operate in a first mode and the electromagnetic signals propagate around the non-reciprocating device terminals in a second direction when the non-reciprocating device is biased in a second mode; (b) a controllable biaser coupled to the circulator so as to bias the non-reciprocating device to operate in one of the first mode and second mode; (c) a signal detector connected to at least one terminal of the non-reciprocating device to detect the electromagnetic signals at the at least one terminal; and (d) a controller connected to the signal detector and the controllable biaser to selectively reverse the polarity of the controllable biaser in response to the detection of a condition in the electromagnetic signals at the at least one terminal.

In some embodiments, the condition detected in the electromagnetic signals is the presence of a high energy level in a detected signal. In some embodiments, the detected signal is a power signal, a voltage signal or a current signal.

In some embodiments, the condition detected comprises that the magnitude of the detected signal magnitude is inappropriate, that the first rate of change of the detected signal is inappropriate, or that the second rate of change of the detected signal is inappropriate.

In some embodiments, the non-reciprocating device is adapted to receive at least one load on at least on terminal adjacent to the at least one terminal connected to the signal detector, the load having an impedance matched to the circulator so as to dissipate the electromagnetic signals.

In some embodiments, the apparatus further comprises at least one delay element at the at least one terminal linked to the signal detector so as to delay the arrival of the electromagnetic signals upon detection of the condition thereby providing more time for the controller to operate.

In some embodiments, the non-reciprocating device comprises four terminals t1, t2, t3 and t4. In some embodiments, terminal t2 is adapted to connect with a propagation medium for receiving a received signal and transmitting a transmit signal, terminal t1 is adapted to receive the transmit signal as an input, terminal t3 is adapted to output the received signal, terminal t4 is adapted to have a load with an impedance matched to the non-reciprocating device so as to dissipate the transmit signal, the signal detector is connected to terminal t3.

In some embodiments, the controllable biaser is an electrically controllable magnet and the non-reciprocating device is magnetically biasable. In some embodiments, the electrically controllable magnet is an electromagnet. In some embodiments, the controllable magnet is controlled by electrical stimulus of a chemical interaction.

In some embodiments, the non-reciprocating device is a circulator.

According to another aspect of the present disclosure, there is provided a transceiver apparatus comprising: (a) the electromagnetic wave circuit disruptor apparatus as recited above; (b) a transmitter block electromagnetically coupled to a first one of the terminals of the electromagnetic wave circuit disruptor apparatus; (c) an antenna block electromagnetically coupled to a second one of the terminals of the electromagnetic wave circuit disruptor apparatus; and (d) a receiver block electromagnetically coupled to a the at least one terminal of the electromagnetic wave circuit disruptor apparatus to which the detector is attached such that the electromagnetic wave circuit disruptor mitigates the potential damage that would occur to the receiver block.

According to another aspect of the present disclosure there is provided: a method of disrupting an electromagnetic wave circuit comprising the steps of: (a) providing a biasable non-reciprocating device having terminals for receiving and transmitting the electromagnetic signals wherein the electromagnetic signals propagate around the non-reciprocating device terminals in a first direction when the non-reciprocating device is biased to operate in a first mode and the electromagnetic signals propagate around the non-reciprocating device terminals in a second direction when the non-reciprocating device is biased in a second mode; (b) providing a controllable biaser coupled to the circulator so as to bias the non-reciprocating device to operate in one of the first mode and second mode; (c) providing a signal detector connected to at least one terminal of the non-reciprocating device to detect the electromagnetic signals at the at least one terminal; and (d) providing a controller connected to the signal detector and the controllable biaser to selectively reverse the polarity of the controllable biaser in response to the detection of a condition in the electromagnetic signals at the at least one terminal.

According to another aspect of the present disclosure, there is provided: a method of disrupting an electromagnetic wave circuit using a biasable non-reciprocal device having terminals for receiving and transmitting the electromagnetic signals wherein the electromagnetic signals propagate around the circulator terminals in a first direction when the circulator is biased to operate in a first mode and the electromagnetic signals propagate around the circulator terminals in a second direction when the circulator is biased in a second mode, comprising the steps of: (a) providing a circuit which operates at a nominal energy level at a select one terminal of the biasable non-reciprocal device; (b) detecting an inappropriate amount of electromagnetic wave energy at the select one terminal, the inappropriate amount of electromagnetic wave energy being substantially larger than the nominal energy level of the circuit; and (c) in response to the detecting step, biasing the non-reciprocal device to operate in a mode which causes the electromagnetic signals to propagate in a direction which mitigates damage to the circuit.

In some embodiments, the method includes the step of providing a load at a terminal adjacent to the select one terminal so as to dissipate the energy of the electromagnetic signals.

Other aspects and features of the present disclosure will become apparent to those ordinarily skilled in the art upon review of the following description of specific embodiments of an electromagnetic wave circuit disruptor and method in conjunction with the accompanying drawing figures.

BRIEF DESCRIPTION OF THE DRAWINGS

Embodiments of the present disclosure will now be described, by way of example only, with reference to the accompanying drawing figures, wherein.

Like reference numerals are used in different figures to denote similar elements unless otherwise noted.

DETAILED DESCRIPTION OF THE DRAWINGS

Figure 1:
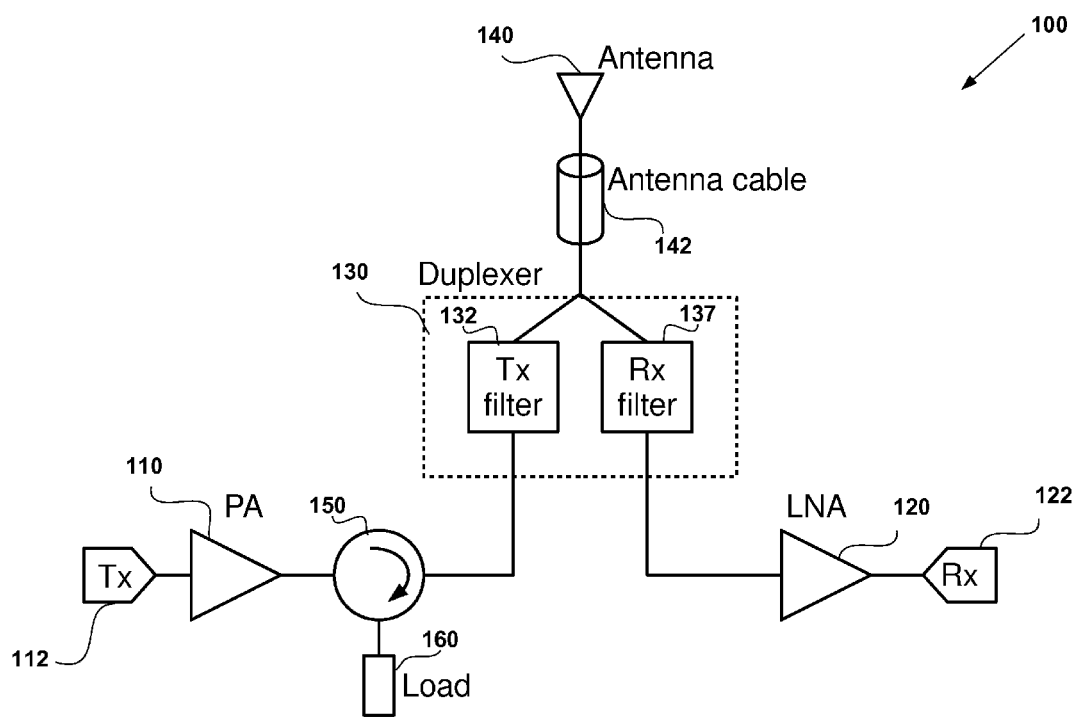
FIG. 1 illustrates a first transmitter-receiver radio system having a circulator and a duplexer.

Referring to the drawings, FIG. 1 illustrates a first transmitter-receiver radio system having a circulator and a duplexer. The first transmitter-receiver radio system 100 illustrated in FIG. 1 includes a Power Amplifier PA 110 for receiving a transmit signal TX 112, a Low Noise Amplifier LNA 120 for providing a received signal RX 122, and a Duplexer 130 connecting both the Power Amplifier PA 110 and the Low Noise Amplifier LNA 120 to an Antenna 140 via an Antenna cable 142. The Duplexer 130 contains a Transmit filter Tx filter 132 and an Rx filter 137 which are adapted to the electromagnetic waves transmitted and received respectively over the propagation medium via the Antenna 140. An optional circulator 150 and Load 160 are provided between the Power Amplifier PA 110 and the Duplexer 130. Operationally, if an impedance mismatch occurs at the terminal of the circulator 150 which leads to the Antenna 140, then the signal from the Power Amplifier PA 110 is dissipated by the Load 160. This can occur, for example, if the Antenna cable 142 or Antenna 140 is disconnected from the Duplexer 130 or becomes damaged or disabled.

Figure 2:
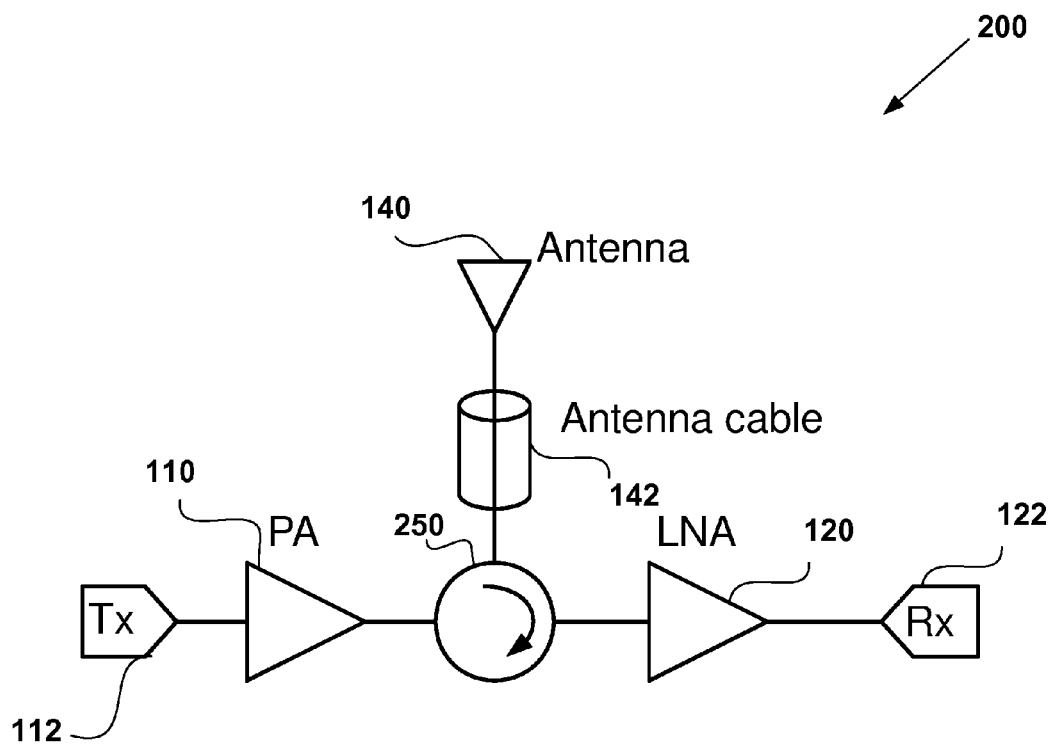
FIG. 2 illustrates a second transmitter-receiver radio system having a circulator/isolator being used instead of a duplexer.

FIG. 2 illustrates a second transmitter-receiver radio system having a circulator/isolator being used instead of a duplexer. The second transmitter-receiver radio system 200 illustrated in FIG. 2 includes a Power Amplifier PA 110 for receiving a transmit signal TX 112, a Low Noise Amplifier LNA 120 for providing a received signal RX 122, and a circulator/Isolator 250 connecting both the Power Amplifier PA 110 and the Low Noise Amplifier LNA 120 to the Antenna 140 via an Antenna cable 142. Operationally, if an impedance mismatch at a terminal of the circulator/Isolator 250 occurs at the terminal which leads to the Antenna 140, then the signal from the Power Amplifier PA 110 may reach the Low Noise Amplifier LNA 120, potentially damaging it. This can occur, for example, if the Antenna cable 142 or Antenna 140 is disconnected from the Duplexer or becomes damaged or disabled.

Figure 3:
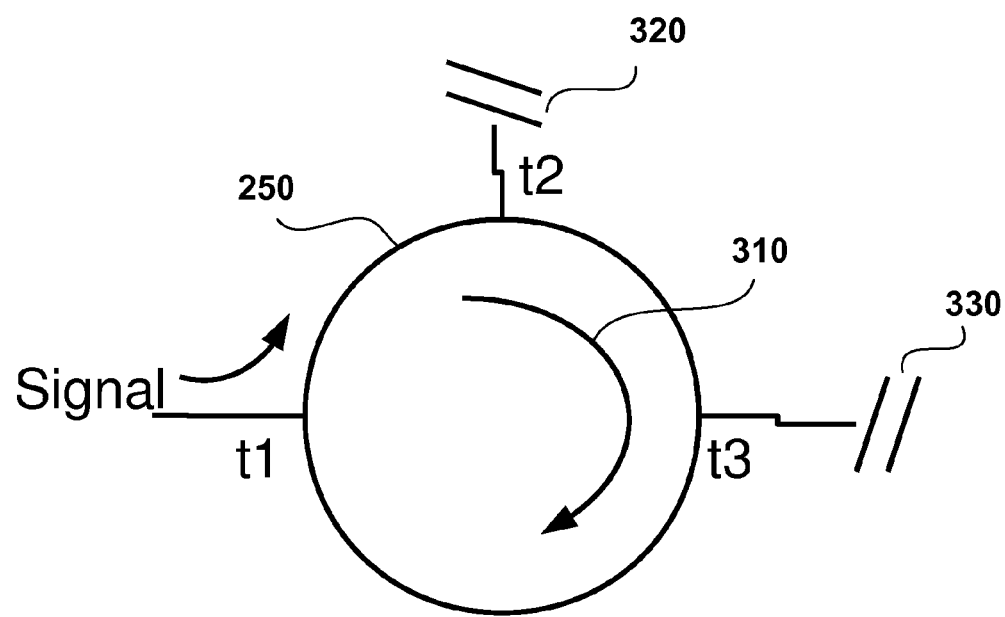
FIG. 3 illustrates an improperly matched circulator.

FIG. 3 illustrates an improperly matched circulator. A Signal enters the circulator 250 via terminal t1 and circulates in the direction of the arrow 310, i.e. clockwise or into the page using the right-hand rule. Since terminal t2 is mismatched, as illustrated by the gap 320 between two lines at the terminal, the signal continues to circulate in the direction of the arrow 310 to terminal t3. This could be, for example, due to the fact that the Antenna 140 or Antenna Cable 142 in FIG. 2 is disconnected or becomes damaged or disabled. When the signal arrives at terminal t3, since terminal t3 is also mismatched, as illustrated by the gap 330 between two lines at the terminal, the signal continues clockwise in the circulator. This could be, for example, due to the fact that the Low Noise Amplifier LNA 120 in FIG. 2 was disconnected or becomes disabled or damaged by the signal.

Operationally, the signals entering a circulator at a terminal travel between terminals in a specific order, so in reference to FIG. 3, starting at terminal t1, the signal will travel to t2 and if improperly matched will travel to t3 which if also improperly matched will travel back to U. If at any terminal the signal is properly matched then the signal will leave the circulator and continue on to circuits connected to that circulator terminal.

Figure 4:
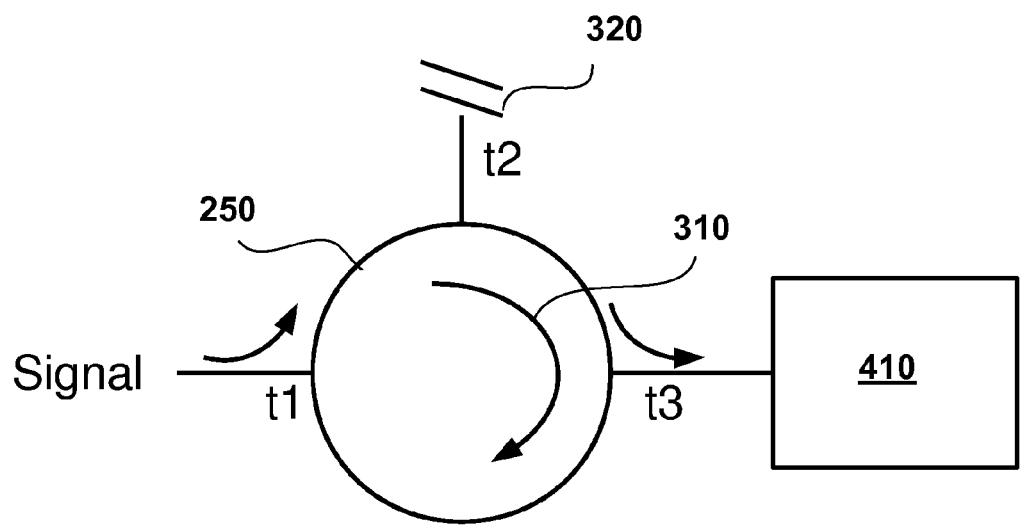
FIG. 4 illustrates a circulator with a matched load at one terminal.

FIG. 4 illustrates a circulator with a matched load at one terminal. A Signal enters the circulator 250 via terminal t1 and circulates in the direction of the arrow 310, i.e. clockwise or into the page using the right-hand rule. Since terminal t2 is mismatched, as illustrated by the gap 320 between two lines at the terminal, the signal continues to circulate in the direction of the arrow to terminal t3. This could be, for example, due to the fact that the Antenna 140 or Antenna cable 142 in FIG. 2 is disconnected or becomes damaged or disabled. When the signal arrives at terminal t3, since terminal t3 is connected to circuit 410, a first portion of the signal continues clockwise in the circulator 400, while a second portion of the signal reaches circuit 410. As shown in FIG. 4, the signal will bypass t2 and leave the circulator at t3 to go through the circuit 410.

Figure 5:
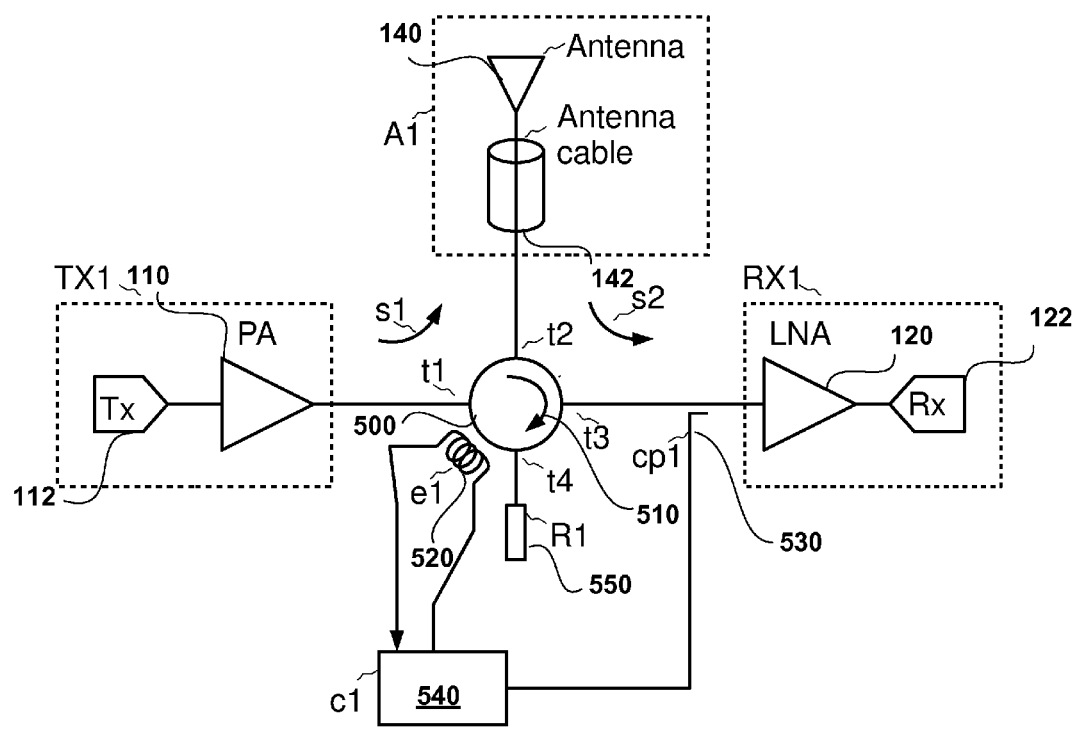
FIG. 5 illustrates a first embodiment of an electromagnetic wave circuit disruptor in normal operation.

FIG. 5 illustrates a first embodiment of an electromagnetic wave circuit disruptor in normal operation. FIG. 5 includes a magnetically biasable non-reciprocal device 500 having four terminals for receiving and transmitting the electromagnetic signals, terminals t1, t2, t3, and t4. The electromagnetic signals s1, s2 propagate around the non-reciprocal device 500 terminals in a first direction (depicted by the clockwise or into-the page arrow 510) when the non-reciprocal device 500 is biased to operate in a first mode. See FIG. 7 for the case where the electromagnetic signals propagate around the non-reciprocal device 500 terminals in a second direction when the non-reciprocal device 500 is biased in a second mode. The apparatus further includes a controllable magnet 520 e1 coupled to the circulator Isolator so as to magnetically bias the non-reciprocal device 500 to operate in one of the first mode and second mode. The apparatus includes a signal detector 530 cp1 connected to terminal t3 of the non-reciprocal device 500 to detect the electromagnetic signals s1, s2 at terminal t3. The apparatus includes a controller c1 540 connected to the signal detector 530 cp1 and the electromagnet 520 e1 to selectively reverse the polarity of the controllable magnet 520 e1 upon the detection of a condition in the electromagnetic signals s1, s2 at terminal t3. Reversing the polarity causes the electromagnetic signals s1, s2 to propagate in a reverse direction (counter-clockwise or into the page) so as to disrupt the action of the electromagnetic signals s1, s2. When the signals reach terminal t4, they are dissipated by the load 550 R1, as will be further described in relation to FIG. 7.

In alternative embodiments, the condition detected in the electromagnetic signals s1, s2 is the presence of an inappropriate amount of a signal indicative of a high energy value, such as but not limited to a high power, voltage or current, or a high rate of change of power, rate of change of voltage, or rate of change of current.

In a first or normal mode of operation, signal s1 is provided by Transmitter TX1 which includes an input for a transmitted signal Tx and a Power Amplifier PA. Signal s1 enters non-reciprocal device 500 via terminal t1, and exits non-reciprocal device 500 via terminal t2 since Antenna and Antenna Cable A1 are matched, and proceeds to propagate over the air (or other medium). A received signal from the air (or other medium) arrives via Antenna and Antenna Cable A1 and enters non-reciprocal device 500 as signal s2 via terminal t2. Since the receiver RX1, which includes Low Noise Amplifier LNA and received signal output Rx, is matched at t3, a matched portion of signal s2 leaves non-reciprocal device 500 at terminal t3. Any unmatched signals proceed to terminal t4 and if matched to load 550 R1 to be dissipated.

Operationally, during normal operation, the transmitter subsystem, TX1, and antenna subsystem, A1, and receiver subsystem, RX1 are connected to the non-reciprocal device 500 in such a manner that outgoing signal, s1, from the transmitter flows to A1 and incoming signal s2 received on the antenna flows from A1 to RX1. Substantially no transmitter signal is detected at signal detector coupler, cp1.

In this case the orientation of the non-reciprocal device 500 is shown as clockwise such that signal travels around the non-reciprocal device 500 terminals in the order t1-t2-t3-t4-t1. The controllable magnet 520 e1, is used to magnetically bias the non-reciprocal device 500 for clockwise operation.

By reversing the polarity of the controllable magnet 520 e1 then the orientation of the non-reciprocal device 500 may be changed, that is the "direction" signals travel in the non-reciprocal device 500 changes. In the example the order could be changed from terminals t1-t2-t3-t1 to t1-t3-t2-t1.

Figure 6:
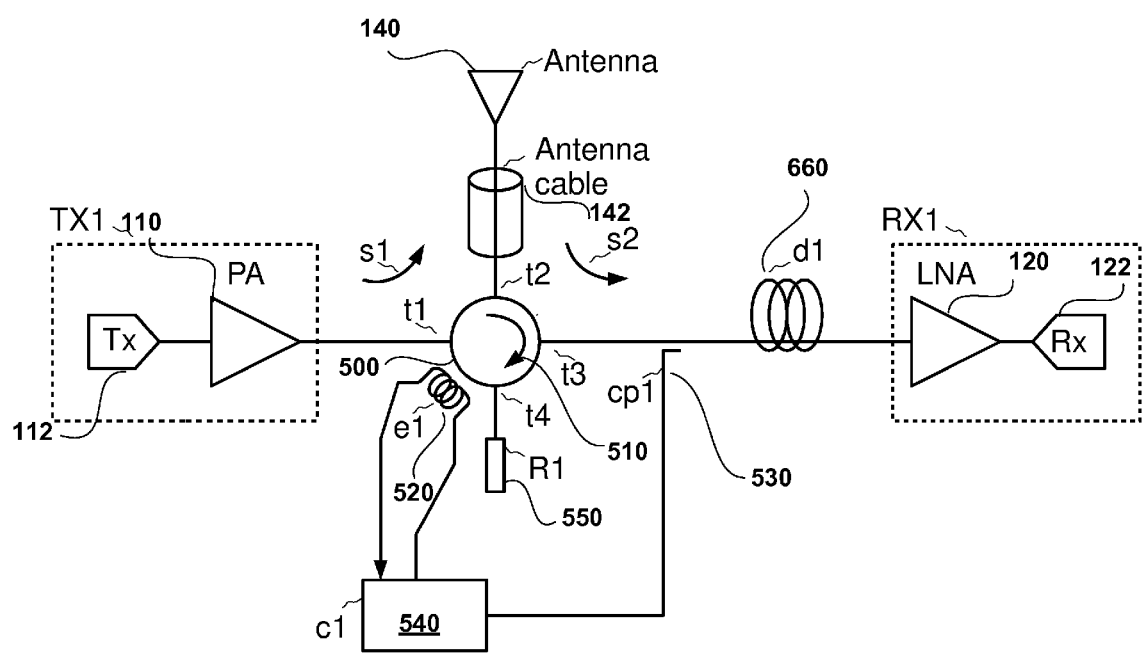
FIG. 6 illustrates a second embodiment of an electromagnetic wave circuit disruptor in normal operation.

FIG. 6 illustrates a second embodiment of an electromagnetic wave circuit disruptor in normal operation. Compared to the first embodiment depicted in FIG. 5, the second embodiment of FIG. 6 further includes at least one delay element 660 d1 at the at least one terminal t3 linked to the signal detector 530 cp1 so as to delay the arrival of the electromagnetic signals s1, s2 upon detection of a condition thereby providing more time for the controller 540 c1 to operate.

Operationally, the amount of operation time required by controller 540 c1 can be increased by adding a corresponding delay 660 d1. This ensures signals s1, s2 d0 not reach receiver RX1 before controller 560 c1 has had the opportunity to reverse the polarity of electromagnet 520 e1. As shown in FIG. 6, the second embodiment adds a delay element 660 d1, between the coupler or signal detector, 530 cp1, and the receiver subsystem or receiver, RX1. The delay element 660 d1 delays the arrival of transmitter power during a failure to allow time for the controller 540 c1 to react to the failure mode and compensate for it. The electromagnetic signals s1, s2 propagate around the circulator terminals in a first direction (depicted by the clockwise or into-the page arrow 510) when the non-reciprocal device 500 is biased to operate in a first mode.

Figure 7:
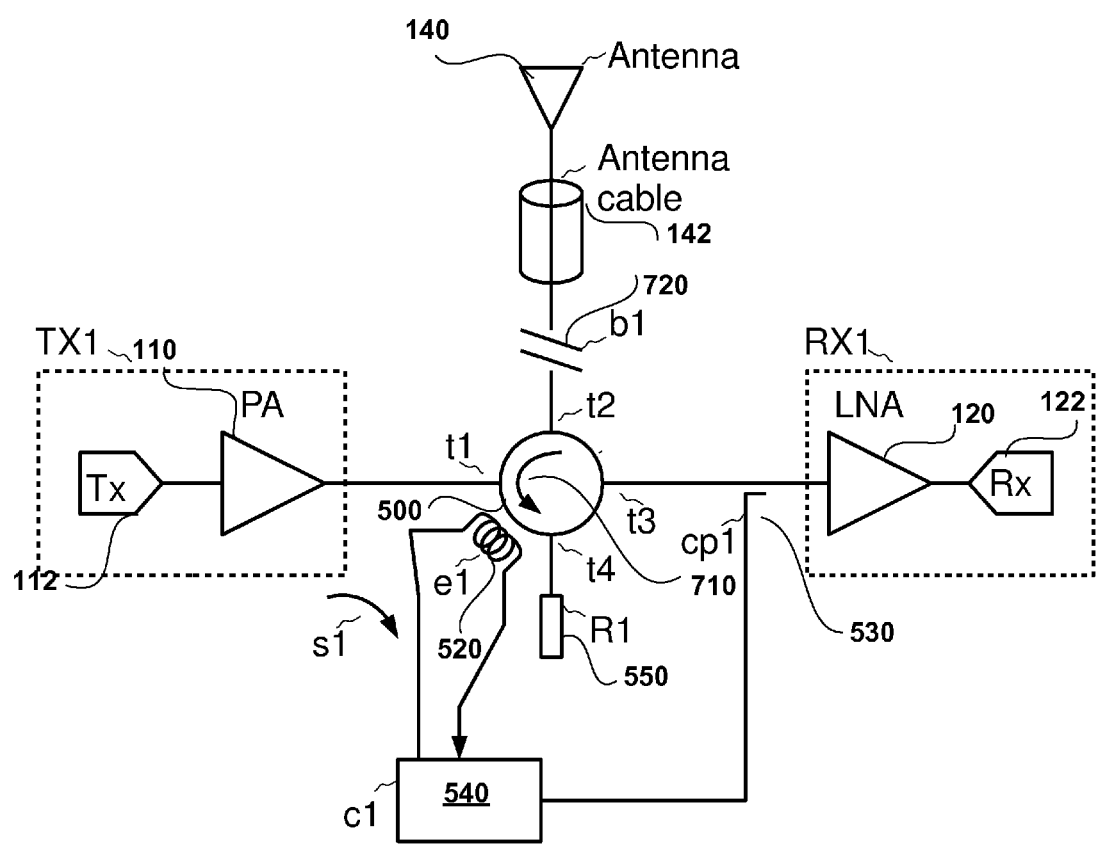
FIG. 7 illustrates the first embodiment of an electromagnetic wave circuit disruptor of FIG. 5 in failure mode operation.

FIG. 7 illustrates the first embodiment of an electromagnetic wave circuit disruptor of FIG. 5 in failure mode operation. The block diagram of FIG. 7 contains the same elements as in FIG. 5 but differs in its mode of operation.

Operationally, in failure mode where for example antenna subsystem A1 has been disconnected 720 from the non-reciprocal device 500 terminal t2, momentarily the transmitter signal is detected at signal detector 530 cp1 so the controller 540 c1 reverses the polarity of the controllable magnet 520 e1. The reversal of the polarity of the controllable magnet 520 e1 cause the non-reciprocal device 500 orientation to change from clockwise to counter-clockwise and signal s1 now travels from non-reciprocal device 500 terminal t1 to t4 as indicated by arrow 710. The load 550 R1, is matched to the non-reciprocal device 500 such that all transmitter power is now dissipated in load 550 R1. Substantially no transmitter power is transferred to the receiver subsystem, RX1.

Figure 8:
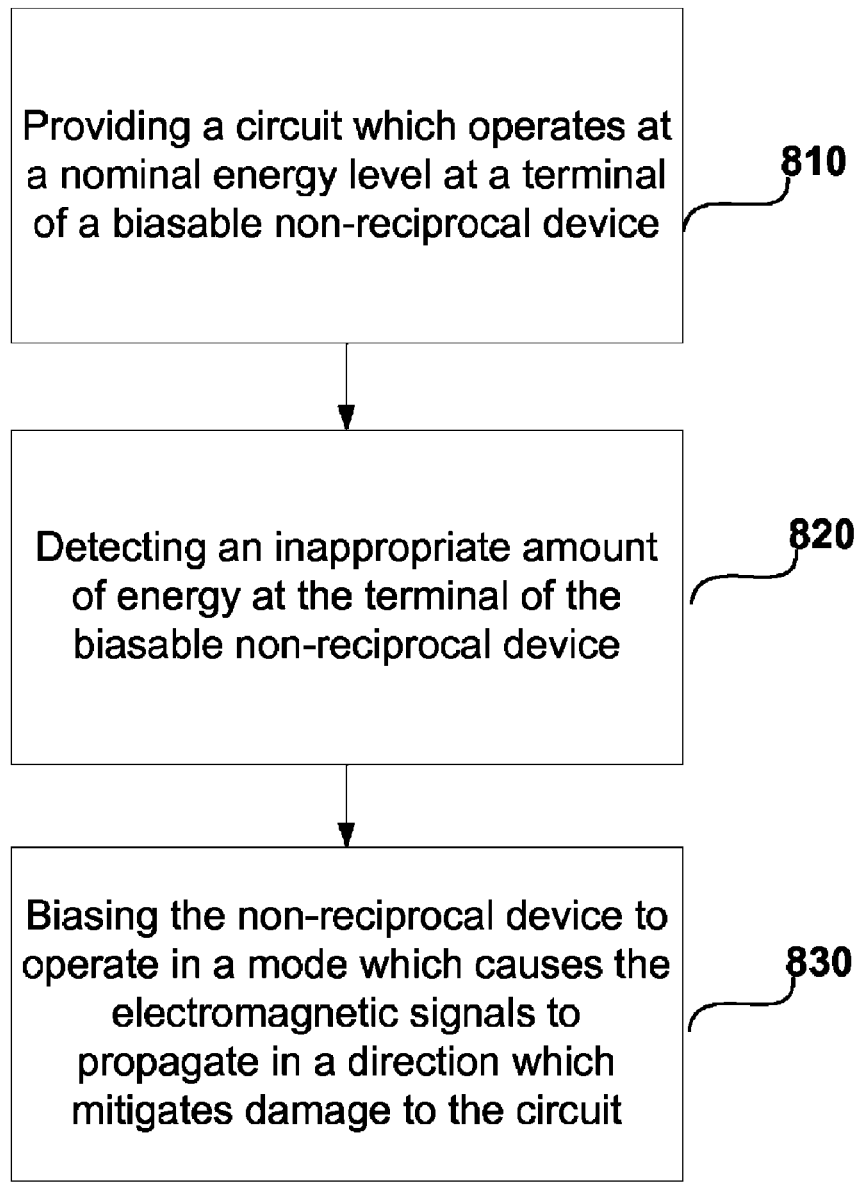
FIG. 8 illustrates a flowchart provided in accordance with one embodiment of an electromagnetic wave disrupter method.

FIG. 8 illustrates a flowchart provided in accordance with one embodiment of an electromagnetic wave disrupter method. According to another aspect of the present application, there is provided a method of disrupting an electromagnetic wave circuit using a biasable non-reciprocal device having terminals which are sequentially traversed by an electromagnetic wave signal in one of two directions. The method includes the steps of: 810 providing a circuit which operates at a nominal energy level at a select one terminal of the biasable non-reciprocal device; 820 detecting an inappropriate amount of electromagnetic wave energy at the select one terminal, the inappropriate amount of electromagnetic wave energy being substantially larger than the nominal energy level expected for the normal operation of the circuit; and 830 in response to the detecting step, biasing the non-reciprocal device to reverse the direction of sequential traversal of the electromagnetic wave signal so as to mitigate damage to the circuit. Although not shown in the drawings, one embodiment of the method includes providing a load at a terminal adjacent to the select one terminal so as to dissipate the energy of the electromagnetic signals.

The above-described embodiments of the present application are intended to be examples only. Those of skill in the art may effect alterations, modifications and variations to the particular embodiments without departing from the scope of the application, which is set forth in the claims.

For example, in alternative embodiments, the non-reciprocal device is provided by a circulator, or any other non-reciprocal device that would be apparent to a person of ordinary skill in the art in view of the present disclosure. Embodiments with alternatives to a non-reciprocal device are intended to be within the scope of the claims.

For example, in alternative embodiments, the controllable magnet is provided by an electrically controllable magnet, electromagnet, or any other controllable magnet via electrical stimulus of a chemical interaction, or other controllable magnet that would be apparent to a person of ordinary skill in the art in view of the present disclosure. Embodiments with alternatives to a controllable magnet are intended to be within the scope of the claims.

For example, in alternative embodiments, the biasable aspect of the non-reciprocal device is provided by magnetic bias or any other bias technique that would be apparent to a person of ordinary skill in the art in view of the present disclosure. Embodiments with alternatives to biasable non-reciprocal device are intended to be within the scope of the claims.

For example, a transceiver apparatus including an embodiment of an electromagnetic wave circuit disruptor is intended to be within the scope of the claims.

What is claimed is:

1. An electromagnetic wave circuit disruptor apparatus suitable for disrupting the action of electromagnetic signals, the apparatus comprising:
   (a) a biasable non-reciprocating device having terminals for receiving and transmitting the electromagnetic signals wherein the electromagnetic signals propagate around the non-reciprocating device terminals in a first direction when the non-reciprocating device is biased to operate in a first mode and the electromagnetic signals propagate around the non-reciprocating device terminals in a second direction when the non-reciprocating device is biased in a second mode;
   (b) a controllable biaser coupled to a circulator so as to bias the non-reciprocating device to operate in one of the first mode and second mode;
   (c) a signal detector connected to at least one terminal of the non-reciprocating device to detect the electromagnetic signals at the at least one terminal; and
   (d) a controller connected to the signal detector and the controllable biaser to selectively reverse the polarity of the controllable biaser in response to the detection of a condition in the electromagnetic signals at the at least one terminal.

2. The apparatus as recited in claim 1, wherein the condition detected in the electromagnetic signals is the presence of a high energy level in a detected signal.

3. The apparatus as recited in claim 2, wherein the detected signal is a power signal.

4. The apparatus as recited in claim 2, wherein the detected signal is a voltage signal.

5. The apparatus as recited in claim 2, wherein the detected signal is a current signal.

6. The apparatus as recited in claim 2, wherein the condition detected comprises that the magnitude of the detected signal magnitude is inappropriate.

7. The apparatus as recited in claim 2, wherein the condition detected comprises that a first rate of change of the detected signal is inappropriate.

8. The apparatus as recited in claim 2, wherein the condition detected comprises that a second rate of change of the detected signal is inappropriate.

9. The apparatus as recited in claim 1, wherein the non-reciprocating device is adapted to receive at least one load on at least on terminal adjacent to the at least one terminal connected to the signal detector, the load having an impedance matched to the circulator so as to dissipate the electromagnetic signals.

10. The apparatus as recited in claim 1, further comprising at least one delay element at the at least one terminal linked to the signal detector so as to delay the arrival of the electromagnetic signals upon detection of the condition thereby providing more time for the controller to operate.

11. The apparatus as recited in claim 1, wherein the non-reciprocating device comprises four terminals t1, t2, t3 and t4.

12. The apparatus as recited in claim 11, wherein terminal t2 is adapted to connect with a propagation medium for receiving a received signal and transmitting a transmit signal, terminal t1 is adapted to receive the transmit signal as an input, terminal t3 is adapted to output the received signal, terminal t4 is adapted to have a load with an impedance matched to the non-reciprocating device so as to dissipate the transmit signal, the signal detector is connected to terminal t3.

13. The apparatus as recited in claim 1, wherein the controllable biaser is an electrically controllable magnet and the non-reciprocating device is magnetically biasable.

14. The apparatus as recited in claim 13, wherein the electrically controllable magnet is an electromagnet.

15. The apparatus as recited in claim 14, wherein the controllable magnet is controlled by electrical stimulus of a chemical interaction.

16. The apparatus as recited in claim 1, wherein the non-reciprocating device is a circulator.

17. A transceiver apparatus comprising:
   (a) the electromagnetic wave circuit disruptor apparatus as recited in claim 1;
   (b) a transmitter block electromagnetically coupled to a first one of the terminals of the electromagnetic wave circuit disruptor apparatus;
   (c) an antenna block electromagnetically coupled to a second one of the terminals of the electromagnetic wave circuit disruptor apparatus; and
   (d) a receiver block electromagnetically couple to the at least one terminal of the electromagnetic wave circuit disruptor apparatus to which the detector is attached such that the electromagnetic wave circuit disruptor mitigates the potential damage that would occur to the receiver block.

18. A method of disrupting an electromagnetic wave circuit comprising the steps of:
   (a) providing a biasable non-reciprocating device having terminals for receiving and transmitting the electromagnetic signals wherein the electromagnetic signals propagate around the non-reciprocating device terminals in a first direction when the non-reciprocating device is biased to operate in a first mode and the electromagnetic signals propagate around the non-reciprocating device terminals in a second direction when the non-reciprocating device is biased in a second mode;
   (b) providing a controllable biaser coupled to a circulator so as to bias the non-reciprocating device to operate in one of the first mode and second mode;
   (c) providing a signal detector connected to at least one terminal of the non-reciprocating device to detect the electromagnetic signals at the at least one terminal; and
   (d) providing a controller connected to a signal detector and the controllable biaser to selectively reverse the polarity of the controllable biaser in response to the detection of a condition in the electromagnetic signals at the at least one terminal.

19. A method of disrupting an electromagnetic wave circuit using a biasable non-reciprocal device having terminals for receiving and transmitting the electromagnetic signals wherein the electromagnetic signals propagate around a circulator terminals in a first direction when the circulator is biased to operate in a first mode and the electromagnetic signals propagate around the circulator terminals in a second direction when the circulator is biased in a second mode, comprising the steps of:
   (a) providing a circuit which operates at a nominal energy level at a select one terminal of the biasable non-reciprocal device;
   (b) detecting an inappropriate amount of electromagnetic wave energy at the select one terminal, the inappropriate amount of electromagnetic wave energy being substantially larger than the nominal energy level of the circuit; and
   (c) in response to the detecting step, biasing the non-reciprocal device to operate in a mode which causes the electromagnetic signals to propagate in a direction which mitigates damage to the circuit.

20. The method as recited in claim 19, further comprising the step of providing a load at a terminal adjacent to the select one terminal so as to dissipate the energy of the electromagnetic signals.

* * * * *

UNITED STATES PATENT AND TRADEMARK OFFICE
CERTIFICATE OF CORRECTION

PATENT NO. : 8,411,601 B2  Page 1 of 1
APPLICATION NO. : 13/014467
DATED : April 2, 2013
INVENTOR(S) : Smiley It is certified that error appears in the above-identified patent and that said Letters Patent is hereby corrected as shown below:

In the Specification:

In Column 3, Line 26, delete "to a the at least" and insert -- to the at least --, therefor.

In Column 5, Line 29, delete "U." and insert -- t1. --, therefor.

In Column 6, Line 58, delete "s2 d0" and insert -- s2 do --, therefor.

In the Claims:

In Column 9, Line 21, in Claim 17, delete "couple to the" and insert -- coupled to the --, therefor.

In Column 10, Line 7, in Claim 18, delete "to a signal" and insert -- to the signal --, therefor.

Signed and Sealed this
Thirteenth Day of August, 2013

Teresa Stanek Rea
*Acting Director of the United States Patent and Trademark Office*